(12) United States Patent
Druist et al.

(10) Patent No.: US 8,956,200 B2
(45) Date of Patent: Feb. 17, 2015

(54) WAFER GROUNDING DESIGN FOR SINGLE PAD LAPPING

(71) Applicant: HGST Netherlands B.V., Amsterdam (NL)

(72) Inventors: David P. Druist, Santa Clara, CA (US); Glenn P. Gee, San Jose, CA (US); Unal M. Guruz, San Jose, CA (US); Edward H. Lee, San Jose, CA (US); David J. Seagle, Morgan Hill, CA (US); Darrick T. Smith, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 251 days.

(21) Appl. No.: 13/690,685

(22) Filed: Nov. 30, 2012

(65) Prior Publication Data

US 2014/0154952 A1    Jun. 5, 2014

(51) Int. Cl.
*B24B 37/005* (2012.01)
*B24B 49/10* (2006.01)
*G11B 5/48* (2006.01)

(52) U.S. Cl.
CPC .......... *G11B 5/4853* (2013.01); *B24B 37/005* (2013.01)
USPC .................................................. 451/1; 451/5

(58) Field of Classification Search
USPC ........ 451/5, 8, 9, 10, 28, 1; 29/603.09, 603.1, 29/603.12, 603.16
See application file for complete search history.

(56) References Cited

U.S. PATENT DOCUMENTS

| | | | |
|---|---|---|---|
| 5,816,890 A * | 10/1998 | Hao et al. | 451/5 |
| 6,027,397 A | 2/2000 | Church et al. | |
| 6,470,566 B2 | 10/2002 | Hsiao et al. | |
| 6,623,330 B2 | 9/2003 | Fukuroi | |
| 6,684,171 B2 * | 1/2004 | Church et al. | 702/104 |
| 6,732,421 B2 | 5/2004 | Gates et al. | |
| 6,994,608 B1 | 2/2006 | Tzeng et al. | |
| 7,014,530 B2 * | 3/2006 | Kasiraj et al. | 451/8 |
| 7,206,169 B2 | 4/2007 | Lee et al. | |
| 7,446,977 B2 | 11/2008 | Nikitin et al. | |
| 7,551,406 B1 | 6/2009 | Thomas et al. | |
| 8,165,709 B1 * | 4/2012 | Rudy | 700/121 |

* cited by examiner

*Primary Examiner* — Robert Rose
(74) *Attorney, Agent, or Firm* — Patterson & Sheridan, LLP (57) ABSTRACT

Embodiments described herein generally relate to connecting Electronic Lapping Guides (ELG) to a lapping controller to reduce resistance from current crowding while reducing connections to the ELG. A device and a system can include a wafer with peripheral grounding vias having a radius of at least 10 μm, a plurality of sliders with a magnetoresistive (MR) elements; a plurality of ELG electrically coupled to the lapping controller through a combination of the wafer and grounding pads and a bonding pad electrically coupled to the ELG. The ELG or the bonding pad can be positioned in the kerf or the device region of a row. If the ELG and the bonding pad are positioned in separate regions, a noble metal should be used to connect. Further, the number of grounding pads can be reduced by using grounding vias at specific intervals and specific sizes.

21 Claims, 6 Drawing Sheets

WAFER GROUNDING DESIGN FOR SINGLE PAD LAPPING

BACKGROUND OF THE INVENTION

1. Field of the Invention

Embodiments of the present invention generally relate to using electronic lapping guides to control stripe height during lapping, or more specifically, to minimize resistance changes to an electronic lapping guide during single pad lapping.

2. Description of the Related Art

Disc drives are well known in the art and comprise several discs, each disc having several concentric data tracks for storing data. A magnetic read/write transducing head carried by a slider is used to read from or write to a data track on a disc. Such sliders, as well as the transducing heads, are typically produced by using thin film deposition techniques. In a typical process, an array of sliders are formed on a common substrate, such as a wafer. The wafer is typically inspected, and is then sliced to produce rows, with a row of sliders in a side-by-side pattern on each row. The rows are then lapped at the surface that will eventually face the recording medium to obtain the desired magnetoresistive (MR) element height (also referred to as the specified stripe height). After lapping, an air bearing pattern is formed on the rows and the rows are diced to produce individual sliders.

With the move to higher areal densities on discs, there is pressure to reduce the stripe height on the sliders. Reducing the stripe height permits an increase in areal densities and signal quality. However, problems emerge as stripe heights decrease. As stripe heights are reduced, seemingly minor variances in the stripe heights from slider to slider will produce different signal amplitudes in each of the sliders. These differing amplitudes make it difficult to control the signal from slider to slider. Thus, though it desired to reduce the stripe heights, it is also desired that the MR elements for each slider on the row be lapped to the same stripe height.

To achieve reduced stripe heights on the sliders, accurate control of the manufacturing process has become critical. Current designs for controlling the lapping process involves placing one or more electronic lapping guides (ELG) on the row. During the lapping process, material is removed from the surface of the row. As material is removed from the surface of the row, material is likewise removed from the ELGs attached to the row.

The ELG is connected to a lapping controller which provides a current to the ELG and determines the stripe height of the ELG based on resistance between the bonding pad and the grounding pad. The ELGs have a known resistance per unit of thickness so that as the surface of the row is lapped, the resistance of the lapping sensor changes. The ELGs are monitored during lapping to provide feedback to a control system indicating the amount of material being removed from the row by the lapping device.

The ELG is connected to a lapping controller by either a 2 wire (double pad) connection or a 1 wire (single pad) connection. Though a single pad connection ELG allows for fewer bonding connections and more space conservation, precision decreases compared to a double pad connection ELG. When lapping multiple heads of a row using a single pad connection ELG, the resistance detected at one ELG may not properly correlate to the resistance detected at the next ELG. This change in resistance can adversely affect proper lapping from one slider to the next.

Thus there is a need for better control of resistance detected at the ELG during single pad connection lapping of a slider.

SUMMARY OF THE INVENTION

Embodiments of the present invention generally relate to using electronic lapping guides to control slider stripe height during single pad connection lapping. In one embodiment, a device can include a wafer comprising a plurality of peripheral grounding vias for controlling current crowding, the peripheral grounding vias having a radius of at least 10 μm, a plurality of sliders disposed on the wafer, the sliders comprising a magnetoresistive (MR) element configured to detect magnetic orientation changes, create magnetic orientation changes or combinations thereof in a magnetic media, and an air bearing surface (ABS) formed proximate to the MR element, a kerf region positioned between the plurality of sliders, a plurality of electronic lapping guides (ELG) electrically coupled to one or more grounding vias and one or more grounding pads, the ELG configured to provide a resistance, and a bonding pad electrically coupled to the ELG, wherein the bonding pad, the ELG, and the wafer are part of a current path permitting current to flow through the ELG.

In another embodiment, a device can include a row separated from a wafer, such as a wafer, the row comprising a plurality of kerf regions and a plurality of device regions, a MR element disposed on the device regions and configured to detect magnetic orientation changes, create magnetic orientation changes or combinations thereof in a magnetic media, an electronic lapping guides (ELG) electrically coupled to the wafer, the ELG including a first internal lead connected to a bonding pad, and a second internal lead connected to either a grounding pad or a grounding via for providing an electrical connection to the lapping controller, one or more bonding pads electrically coupled to each of the ELG, and one or more peripheral grounding vias positioned outside of the device region.

In another embodiment, a system can include a wafer comprising a plurality of slider-kerf groups, each slider-kerf group comprising a slider-kerf boundary dividing a slider portion from a kerf portion, an MR element configured to sense data stored in a magnetic media, write data to the magnetic media or combinations thereof, an ELG configured to indicate, using a resistance of the ELG, a stripe height of the sensor, wherein the ELG is either electrically coupled to either the wafer through a grounding via or to the grounding pad, a peripheral grounding via in contact with a high conductivity material, wherein at least one grounding via is formed for every slider-kerf group, and a bonding pad electrically coupled to the ELG, providing a current path permitting current to flow to the ELG, a lapping system configured to simultaneously lap an air bearing surface on the plurality of sliders, wherein the wafer is mounted on the lapping system, and a lapping controller electrically coupled to the bonding pads, the grounding pads and the peripheral grounding vias, the lapping controller configured to measure the resistance of the ELG using the current path and provide instructions to the lapping system based on the measured resistance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments described herein generally relate to connecting an ELG to a lapping controller such that the number of wire bonds from the controller to the ELG is minimized while maintaining proper lapping. When lapping the ABS of a slider or row of sliders, the electrical resistance of the ELG is used to adjust the lapping process and set the stripe height for a magnetoresistive element on the slider. Specifically, as an exterior surface of the ELG at the ABS is lapped, the resistance of the ELG increases. Once the resistance corresponds to the desired stripe height—i.e., the distance between the ABS and the back edge of the sensor—the lapping process is stopped. To measure the electrical resistance of the ELG, a lapping controller is wire bonded to at least one pad that electrically connects the controller to the ELG. In addition to being connected to the pad, the ELG is electrically connected to either a grounding pad or the wafer. The wafer may be used as a common ground for the current that flows through the bond pad and the ELG.

Because many head fabrication techniques lap a plurality of heads simultaneously, each ELG in the heads may be electrically coupled to the wafer. The lapping controller is then wire bonded to the individual ELGs via respective pads, but the controller is connected to the wafer only at a few locations. For example, the lapping controller may be wire bonded to thirty ELGs in a row of heads but only have one or two electrical connections to the conductive wafer.

Though this design reduces the space used for lapping control, the number of grounding connections formed with the ELG is also reduced. Thus, lapping becomes less precise due to a phenomena called current crowding. Current crowding occurs from charges that accumulate in the wafer from the current flow from the lapping controller to the ELG which accumulate in the wafer due to insufficient grounding. The accumulated charges alter the measured resistance at the ELG. Further, current crowding increases during multi-channel testing. Charges tend to accumulate at the grounding vias both in relation to the size of the via and the positioning of the via. By controlling the size and position of the via, current crowding can be effectively controlled to allow for multi-channel testing of a row during lapping.

The ELG can be positioned in the kerf region between respective sliders in a row. This allows for smaller sliders and better use of the non-device surface area of the row. In this design, the bonding pad for the ELG is generally positioned in the device region for space conservation purposes. To complete the circuit, an electrical connection to the ELG is formed across the kerf-device boundary to connect the ELG to the bonding pad. However, when the sliders are cut from the row, the electrical connection formed across the kerf-device boundary can corrode or flake, thus damaging the formed slider after cutting. However, by forming the electrical connection from a noble metal or repositioning the bonding pad outside of the device region when the ELG is formed in the kerf, corrosion and flaking can be avoided.

Figure 1:
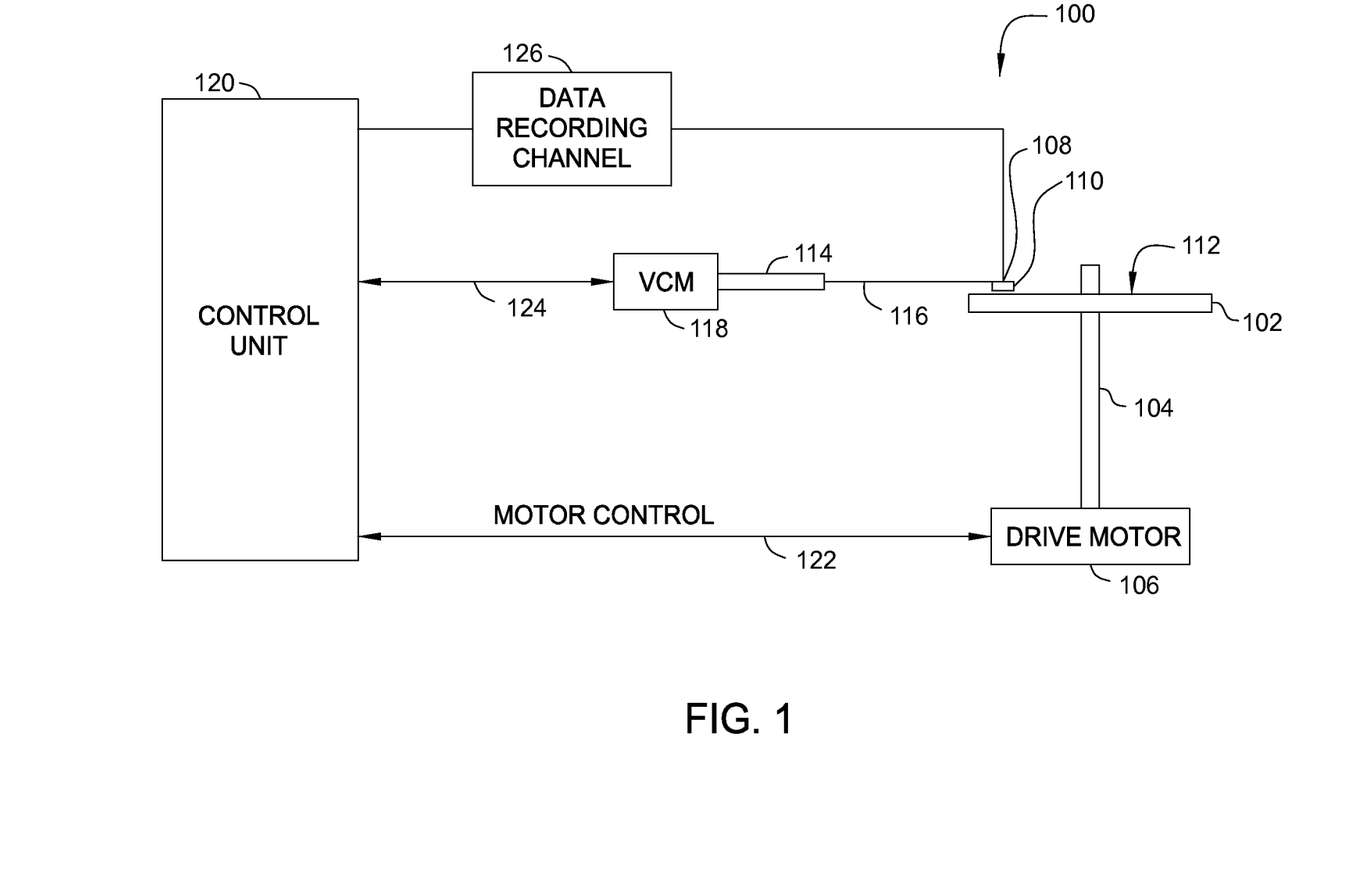
FIG. 1 illustrates a disk drive system, according to embodiments described herein.

FIG. 1 illustrates a disk drive embodying this invention. As shown, at least one rotatable magnetic disk 102 is supported on a spindle 104 and rotated by a disk drive motor 106. The magnetic recording on each disk is in the form of annular patterns of concentric data tracks (not shown) on the magnetic disk 102.

At least one slider 108 is positioned near the magnetic disk 102, each slider 108 supporting one or more MR elements 110, which form a part of the read/write head. As the magnetic disk rotates, the slider 108 moves radially in and out over the disk surface 112 so that the MR elements 110 may access different tracks of the magnetic disk 102 where desired data is written. Each slider 108 is attached to an actuator arm 114 by way of a suspension 116. The suspension 116 provides a slight spring force which biases the slider 108 against the disk surface 112. Each actuator arm 114 is attached to an actuator means 118. The actuator means 118 as shown in FIG. 1 may be a voice coil motor (VCM). The VCM comprises a coil movable within a fixed magnetic field, the direction and speed of the coil movements being controlled by the motor current signals supplied by control unit 120.

During operation, the rotation of the magnetic disk 102 generates an air bearing between the slider 108 and the disk surface 112 which exerts an upward force or lift on the slider 108. The air bearing thus counter-balances the slight spring force of suspension 116 and supports slider 108 off and slightly above the magnetic disk 102 surface by a small, substantially constant spacing during normal operation.

The various components of the disk drive 100 are controlled in operation by control signals generated by control unit 120, such as access control signals and internal clock signals. Typically, the control unit 120 comprises logic control circuits, storage means and a microprocessor. The control unit 120 generates control signals to control various system operations such as drive motor control signals on line 122 and head position and seek control signals on line 124. The control signals on line 124 provide the desired current profiles to optimally move and position slider 108 to the desired data track on magnetic disk 102. Write and read signals are communicated to and from write and read heads on the MR element 110 by way of recording channel 126.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
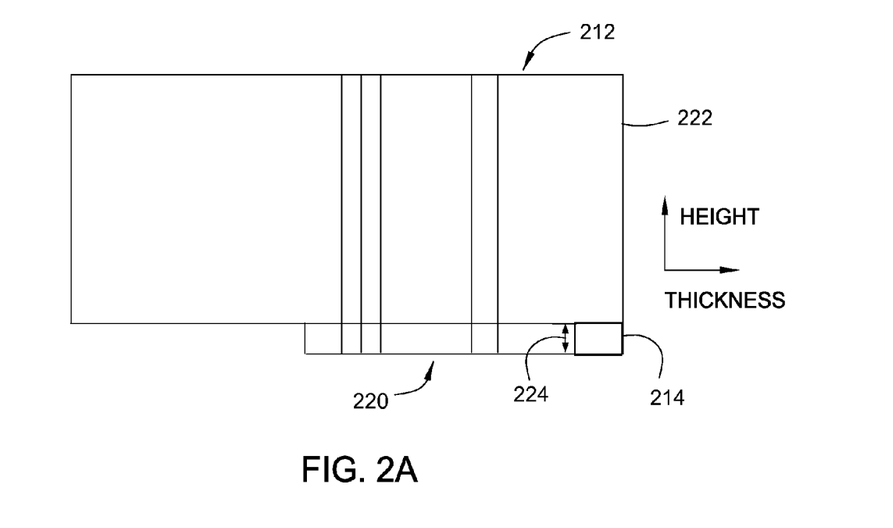
FIG. 2A is a cross-sectional view of a portion of the slider according to one embodiment.

FIG. 2A is a cross-sectional view of a portion of the slider 212 according to one embodiment. The MR element 214 is shown proximal to air bearing surface 220. The MR element 214 represents the portion of magnetic read/write head which contains the read sensor and write poles. The MR element 214 has a stripe height 224, which is greatly exaggerated relative to the total height of slider 212 as illustrated in FIG. 2A. Typically, the stripe height 224 of the MR element 214 is on the order of microns. The height of the slider 212 is approximately 0.23 millimeter. Thus, the height of the MR element 214 is roughly 100 times smaller than the height of the slider 212 at wafer level and 10,000 times after lapping.

The read/write heads are formed at the wafer level using a variety of methods, for instance, deposition and photolithography techniques. Multiple sliders, as many as 40,000 or more, may be formed on one wafer. The wafer is then sliced into rows, each row having up to 60-70 sliders. The rows are lapped to finish or polish the surface of what will eventually become the air bearing surface 222. As part of the lapping process, the MR element 214 is lapped until it reaches the desired stripe height 224.

Figure 2B:
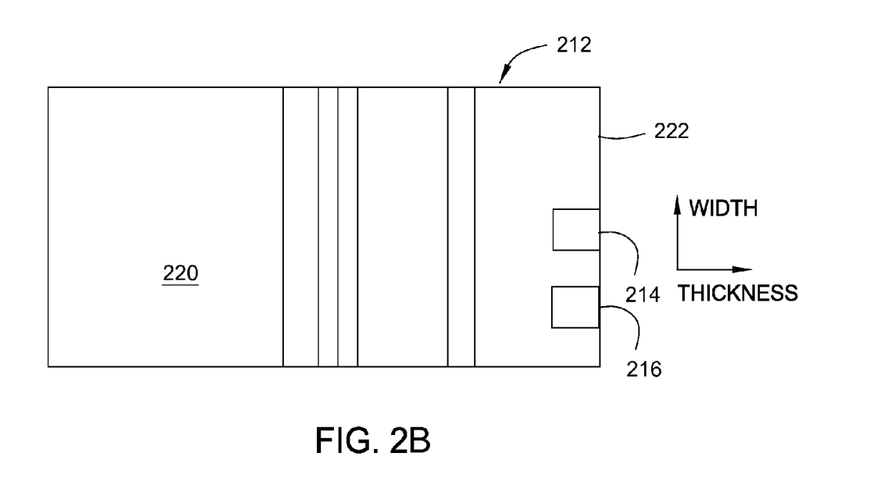
FIG. 2B is a bottom view of a portion of a slider according to one embodiment.

FIG. 2B is a bottom view of the slider 212 according to one embodiment. The bottom view shown in FIG. 2B corresponds to what eventually becomes the air bearing surface 222 of the slider 212 and is the surface of the slider 212 which is lapped by a lapping device (not shown). Visible on the air bearing surface 220 is the MR element 214 containing the read/write element and shields which will be polished to achieve the desired stripe height of the MR element during the lapping process. Methods of lapping the air bearing surface 220 of the slider 212 may include, for instance, a slurry process, a polishing plate using free abrasives such as alumina or diamond dust, or a polishing plate having an abrasive embedded in the plate. The lapping process may begin by performing a more coarse lapping step which removes a larger amount of material from the air bearing surface 220, followed by a fine lapping step focusing on the trailing edge surface 222, and in particular on the MR element 214 to achieve the desired stripe height. An ELG 216 can be formed proximate the air bearing surface 220 to provide a measurement of the stripe height as the lapping proceeds. The ELG 216 need not be formed in the slider or other device region, so long as the ELG 216 is positioned proximate the air bearing surface of the row being lapped, such as an ELG 216 formed in the kerf region next to a slider 212.

Figure 3A:
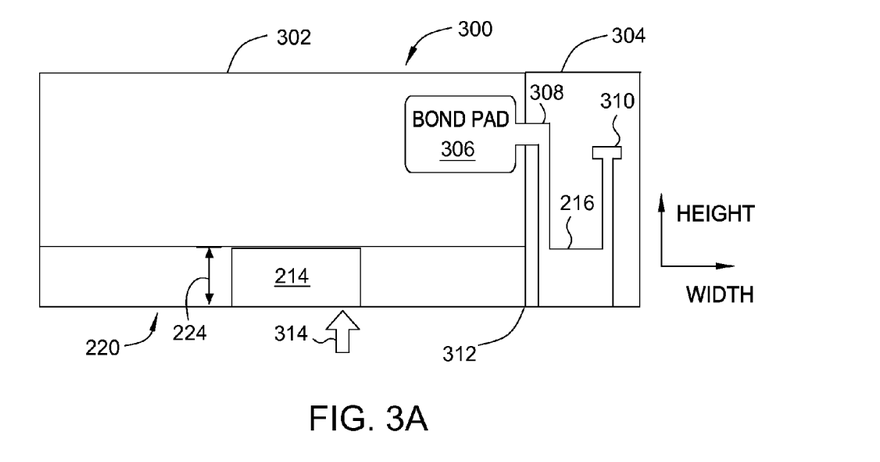
FIG. 3A is a schematic front view of a slider according to another embodiment.

FIG. 3A is a schematic front view of a slider according to another embodiment. FIG. 3A illustrates a wafer 300 with the slider 302 and the kerf region 304. The slider 302 has the MR element 214 formed proximate the air bearing surface (ABS) 220. The ELG 216 is formed in the kerf region 304 at the same thickness as the MR element 214. A bonding pad 306 is formed on the slider 302. The ELG 216 is connected to the bonding pad 306 through a first internal lead 308. The ELG 216 is grounded through a second internal lead 310. The second internal lead can be connected to the wafer 300 through a grounding via (not shown) or to a grounding pad (not shown) for connecting directly to the lapping controller. In one embodiment, the second internal lead 310 alternates from connecting to the wafer 300 through a grounding via to connecting to a grounding pad. The wafer 300 can be composed of titanium carbide, alumina, or other suitable conductive material. In this embodiment, the first internal lead 308 crosses the kerf-slider boundary 312. The first internal lead 308 should be made from a noble metal, such as gold, platinum or another highly conductive and non-corroding metal, so as to avoid corrosion and flaking after the kerf region 304 is removed.

Arrow 314 illustrates an exterior surface of the ELG 216 that is formed into an ABS 220 by the lapping process. During this process, the surface of the ELG 216 on the ABS 220 is lapped or polished by an abrasive surface which decreases the physical dimensions of the ELG 216. As a physical dimension of the ELG 216, such as the height, is decreased by the lapping process, the current flowing through the ELG 216, and thus, the resistance of the ELG 216 is changed. Decreasing the size of the ELG 216 reduces the amount of area in which the current can flow, thereby increasing the electrical resistance. The lapping controller measures the resistance based on the current flowing through the ELG 216 and determines a corresponding stripe height 224 based on the resistance. Lapping is stopped once the desired stripe height 224 is achieved, as measured at the ELG 216. The lapping controller may be preconfigured to contain a data structure that correlates a measured resistance to the physical dimensions of the ELG 216. Although the embodiments presented herein discuss lapping as the chosen method for forming the ABS 220 and setting the stripe height 224, other planarization techniques may be used to set the stripe height 224.

It is important to note that FIG. 3A illustrates a side view of the slider 302 formed on the wafer 300 where other elements of the slider 302 and the MR element 214 are omitted. Specifically, FIG. 3A illustrates only the components used in the slider 302 and kerf region 304 to connect an ELG 216 to an electrical circuit. A lapping controller (not shown) is electrically coupled to the ELG 216 by connecting a conductive wire, such as a gold or copper wire, or other highly conductive material, to a bonding pad 306. A connective material (e.g., a melted portion of a bond wire, a solder bump, conductive paste/epoxy, ultrasonic bonding, and the like) may be used to physically and electrically couple the conductive wire to the bonding pad 306.

Figure 3B:
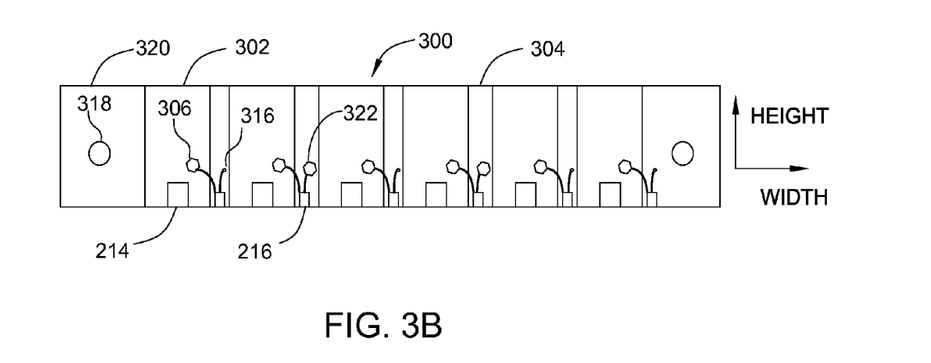
FIG. 3B is a schematic view of a row including several individual sliders according to one embodiment.

FIG. 3B depicts a schematic view of a row 320 including several individual sliders 302 according to one embodiment. The wafer 300 has been cut into several rows, one of which is depicted here as row 320. Row 320 comprises a plurality of sliders 302 with a plurality of kerf regions 304. The sliders 302 include the MR element 214. Proximate to the MR element 214 is the ELG 216. In this embodiment, the ELG 216 is formed in the kerf region 304. The ELG 216 is electrically connected to the bonding pad 306. Further, the ELG 216 is either electrically connected to a grounding pad 318 or a grounding via 316. The grounding pad 322 is a contact point for the lapping controller, thus allowing the lapping controller can determine the resistance at the ELG 216. However, the lapping controller can also electrically connect to the grounding via 316 through the wafer 300, as the wafer 300 is electrically conductive. The row 320 further includes one or more peripheral grounding vias 318. The lapping controller at least connects to the bonding pads 306 and one of the peripheral grounding vias 318, preferably to all available bonding pads 306 and both peripheral grounding vias 318.

Without intending to be bound by theory, it is believed that a pad, such as the grounding pad 322, must be from about 60 to about 100 microns in diameter to allow a proper connection with the conductive wires from the lapping controller. As the components decrease in size, this space consumption becomes prohibitively large. The grounding vias 316 are significantly smaller and they reduce the number of required contacts from the lapping controller. However, the grounding vias 316 allow charges from the lapping controller to accumulate, thus increasing the apparent resistance of the ELG 216 and leading current crowding and to improper lapping at the affected slider 302. By alternating between connecting the ELG 216 through grounding vias 316 and through grounding pads 322, more space can be conserved for the formation of sliders 302 on the row 320. Though the embodiments described above reflect an alternating pattern of grounding vias 316 and grounding pads 322, one skilled in the art will understand that there is a wide variety of combinations of grounding pads 322 and grounding vias 316 which can be employed without diverging from the teachings disclosed herein.

Figure 4:
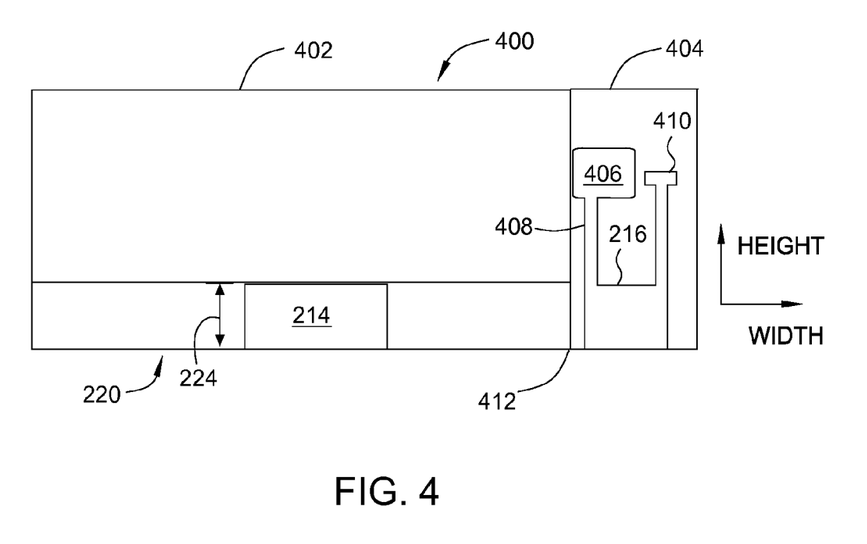
FIG. 4 is a schematic front view of a slider with the bonding pad in the kerf according to another embodiment.

FIG. 4 is a schematic front view of a slider with the bonding pad in the kerf region according to another embodiment. The wafer 400 comprises a slider 402 and a kerf region 404. In practice, one or more sliders 402 and one or more kerf regions 404 will be formed on the wafer 400 as depicted in FIG. 3B. The slider 402 comprises an MR element 214 formed proximate to the ABS 220. In this embodiment, the ELG 216 is formed in the kerf region 404 alongside the bonding pad 406 and either the grounding via or the grounding pad (not shown). The ELG is connected to the bonding pad 406 through a first internal lead 408. The ELG is connected to either the grounding via or the grounding pad through the second internal lead 410. This embodiment can incorporate the alternating grounding pad/grounding via design described in FIG. 3B, or grounding vias alone and using the wafer 400 to ground through peripheral grounding vias.

The embodiments described with reference to FIG. 4 expand the space used in the kerf region while simultaneously reducing leads across the kerf-device boundary 412 and cost of said leads. Thus, having the bonding pad in the kerf region reduces cost associated with bonding while decreasing the number of sliders per wafer. The grounding pad may be chosen over the grounding via in the kerf region to improve grounding of the ELG at a cost of increasing the kerf region used. This will reduce the number of devices which can be formed on a row and thereby reduce throughput. Therefore, in some embodiments, it is preferable to use at least 30% grounding vias to provide the overall benefits of proper resistance while simultaneously increasing the number of devices per wafer. In other embodiments, the wafer could have 1 grounding via for every slider-kerf group.

The peripheral grounding vias can also cause current crowding. Without intending to be bound by theory, the fewer grounding connections which the lapping controller forms with the wafer, the higher propensity of current crowding. Current crowding is greater near the peripheral grounding via as the via creates an accumulation point for the charges fed into the wafer from the lapping controller as connected to the bonding pads.

Figure 5:
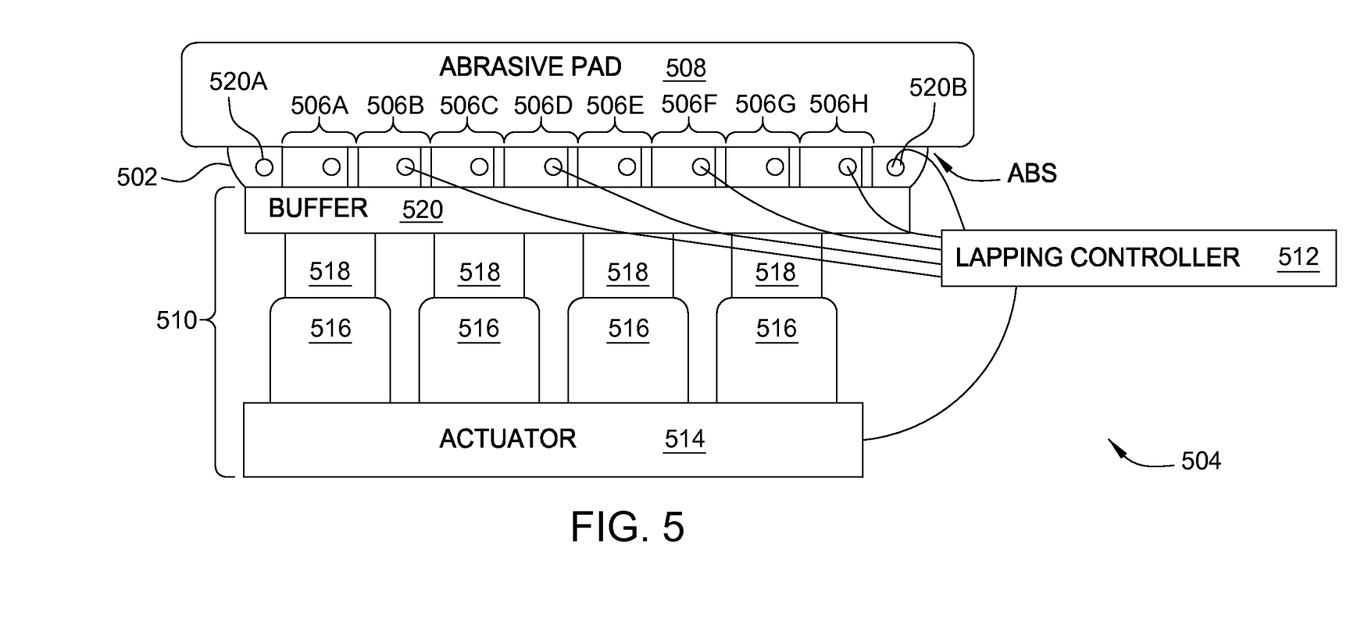
FIG. 5 illustrates lapping a row based on a measured resistance of one or more ELGs, according to one embodiment.

FIG. 5 illustrates lapping a row 502 based on a measured resistance of one or more ELGs, according to embodiments described herein. The row 502 diced from the wafer is mounted into the lapping system 504. As shown, the row 502 includes a plurality of slider-kerf groups 506A-506H. Only eight slider-kerf groups are shown, but the number of slider-kerf groups per each row may vary depending on the particular portion of the wafer 300 the row was diced from. Accordingly, each row 502 may include only one slider-kerf group or even a hundred slider-kerf groups. Each slider-kerf group 506A-506H includes an ELG, a bonding pad and a grounding pad or grounding via as exemplified in the embodiments described with reference to FIGS. 2A-4. The row 502 may have one or more peripheral grounding via, as described with reference to FIG. 3B. The slider-kerf groups 506A-506H and the row 502 may incorporate any embodiment described herein. For example, the bonding pad or the ELG may be formed in the kerf region or on the slider. Further examples can include, a grounding pad or grounding via that is electrically connected to the ELG which alternates between slider-kerf groups.

The lapping system 504 also includes an abrasive pad 508, force system 510, and a lapping controller 512. The abrasive pad 508 may include one or more separate pads that rub against the ABS of the slider-kerf groups 506A-506H, thereby removing portions of the ABS and reducing the height of the MR elements. The abrasive pad 508 may be an abrasive material such as diamond particles, aluminum oxide, or silicon carbide that grinds or laps away the portion of the slider-kerf groups 506A-506H that the abrasive pad 508 contacts. Alternatively, the abrasive pad 508 may be a softer material such as tin that is "charged" with an abrasive to lap the ABS.

The force system 510 includes an actuator 514, pistons 516, rods 518, and a buffer 520. The actuator 514 is communicatively coupled to the lapping controller 512 and receives instructions for separately controlling the respective pistons 516. Stated differently, the actuator 514 uses the lapping controller 512 to determine how much force to apply to different portions of the row 502. The pistons 516 may be electrically, magnetically, pneumatically, or hydraulically controlled to apply a specified pressure or force to the buffer 520. The buffer 520—a semi-flexible material such as polyurethane—transfers the force to a respective portion of the row 502. By increasing the force applied by a particular piston 516, the actuator 514 controls the rate at which the abrasive pad 508 grinds a slider-kerf group or group of slider-kerf groups 506. Here, each piston 516 is associated with two slider-kerf groups 506A-506H although each piston 516 may be assigned to more or less than this number. If the actuator 514 is informed by the lapping controller 512 that some subset of the slider-kerf groups 506A-506H are being lapped at a different rate by the abrasive pad 508 relative to another portion, than the actuator 514 can adjust the associated pistons 516 to correct the imbalance.

The lapping controller 512 may be used to determine the lap rate of the different slider-kerf groups 506A-506H and instruct the actuator 514 to correct any imbalance or stop the lapping process when the desired stripe height is achieved. As shown, the lapping controller 512 is electrically coupled (e.g., wire bonded) to the ELG of every other slider-kerf group in the row 502, shown here as slider-kerf groups 506B, 506D, 506F, and 506H, using the bonding pads formed on the slider portion of the slider-kerf group 506. However, the lapping controller 512 may be coupled to more or less than this ratio. In one embodiment, the lapping controller 512 is coupled to as many slider-kerf groups as there are pistons 516 in the actuator 514. That is, the lapping system 504 may designate one the slider-kerf groups associated with a piston 516 as the representative head which is coupled to the lapping controller 512. The resistance of the ELG in the representative slider-kerf group is then measured and used by the lapping controller 512 to control the associated piston 516. However, to improve control, in other embodiments the lapping controller 512 may be coupled to two or more of the slider-kerf groups 506 associated with a single piston 516 and control the piston 516 based on measuring the resistance of both of the ELGs in the two or more heads. For example, the lapping controller 512 may average the measured resistances of the ELGs and use the average resistance to derive the stripe height and control the piston pressure.

Instead of connecting to a plurality of grounding pads, the lapping controller 512 may couple only to a select number of pads. As stated in previous embodiments, the grounding pads may be replaced with grounding vias, which electrically couple the ELG to the row 502. The lapping controller 512 is electrically coupled to the row through the through at least one of the peripheral grounding vias 520A-520B. By connecting each ELG in a plurality of slider-kerf groups 506 to the row 502, the lapping controller 512 in FIG. 3B no longer needs two connections to each slider-kerf group 506. Instead, the lapping controller 512 uses only one connection to bonding pad on a slider-kerf group 506 to access the ELG and a second connection to either the wafer or a grounding pad, thus reducing the number of electrical connections while allowing for proper measurement of the ELG during the lapping process. As shown in FIG. 5, the lapping controller 512 is connected to the bonding pad of slider-kerf groups 506B, 506D, 506F, and 506H but has only one connection to the row 502 through the peripheral grounding via 502B.

Figure 6:
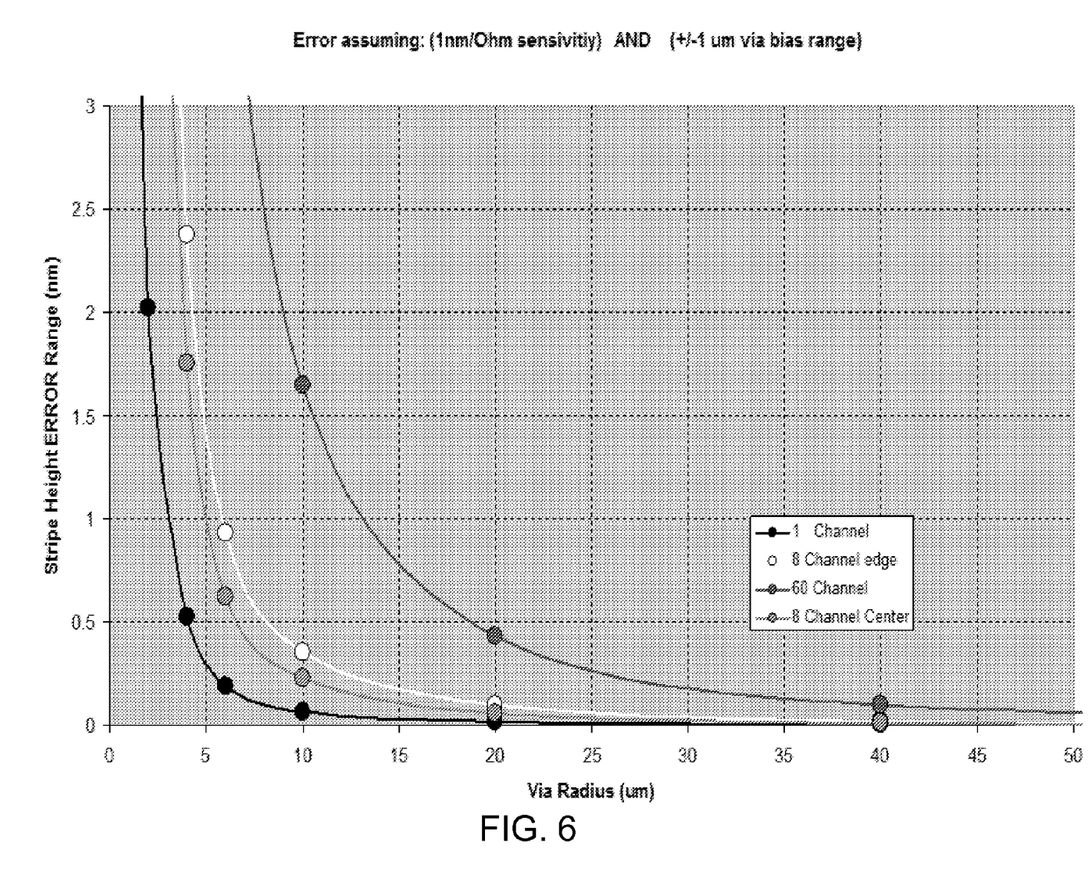
FIG. 6 is a graphical representation of stripe height error as a function of peripheral grounding via size.

FIG. 6 is a graphical representation of stripe height error as a function of peripheral grounding via size. The peripheral grounding vias were formed in an Alumina Titanium Carbide (AlTiC) wafer at 6 radii ranging from 2 um to 40 um. The ELGs were connected to the wafer, thus creating an electrical connection to the peripheral grounding via and completing the circuit back to the lapping controller. Rows were lapped while measuring resistance at either 1 channel, 8 channels (either edge or center) or all 60 channels. An error range was formed from the actual stripe heights as compared to the expected stripe heights based on measured resistance at the lapping controller. Stripe height error range is reported in nm and the via radius has a margin of error of 1 um.

It was expected that the stripe height margin of error during lapping would be least in the 1 channel sample, as there is little likelihood of current crowding with only one ELG being measured. At 2 um radius (4 um diameter) the stripe height error range was 2 nm. As the radius of the peripheral grounding via in the 1 channel sample was increased, the error range significantly decreased. At a 10 um radius and above, the error range was nominal for the 1 channel sample.

In the 8 channel samples as well as the 60 channels samples, the error range decreased with increasing radius. The 8 channel sample at the edge of a row, error rates were consistently higher than error rates for the 8 channel samples at the center of a row. This is believed to relate to proximity of the ELG to the peripheral grounding via which would not allow the charge to disperse across the wafer leading to an increased effect from current crowding on the channel closest to the peripheral grounding via. In the 60 channel sample (60 channels tested and lapped simultaneously), the error rate was highest with an error rate that approached an optimal rate for other samples when the peripheral grounding via had a radius of 20.

The radii determined experimentally above should be considered in light of the space constraints. With consideration that increasing the via size would cause a commensurate decrease in the number of sliders per row and per wafer, the radius of the grounding via or the peripheral grounding via, should be no larger than 30 μm, with preferred embodiments of no larger than 25 μm, such as a radius of no larger than 20 μm. Based on the experimental values above, an optimal radius should be larger than 8 μm, with preferred embodiments of greater than 10 μm, such as a radius of greater than 15 μm. Based on the above analysis, a preferred range of via radii are from 10-25 μm, with a more preferred range of from 15-20 μm.

Without intending to be bound by theory, it is believed that the composition of the metal in the grounding via does not play a significant role in current crowding. Generally, high conductivity metals, such as gold, copper or nickel, are used in the grounding vias. The composition of the wafer creates a resistance that is approximately 50× higher than the metal in the vias. Thus, it is expected that when the wafer is used for grounding, the charges that reach the via are quickly dispersed in the high conductivity metal, whereas current can accumulate in the wafer itself. Therefore, decreasing the effects of current crowding can preferentially be achieved by increasing the available surface inside the grounding via and thus increase the overall transfer rate to the highly conductive metal in the via.

Though the embodiments above focus on an ELG positioned in the kerf region, one skilled in the art will readily understand that similar embodiments can include an ELG positioned in the device region, such as on the slider, without diverging from the embodiments described herein. For example, embodiments of the invention include an ELG formed on the wafer proximate the ABS and the MR elements. The bonding pad can be connected with the ELG. The bonding pad may be positioned in the kerf region or in the device region, thus including a lead which crosses the kerf-device boundary. The embodiment may include a grounding pad, a grounding via or combinations thereof, such as an alternating grounding pad-grounding via design as described with reference to FIG. 3B.

CONCLUSION

Embodiments described herein generally relate to use of grounding vias during lapping to better conserve space on a wafer for increased slider throughput. During a lapping process, the electrical resistance of the ELG is used to adjust the lapping and set the stripe height for a MR element on a slider. Specifically, as an exterior surface of the ELG at the ABS is lapped, the resistance of the ELG increases. Once the resistance corresponds to the desired stripe height—i.e., the distance between the ABS and the back edge of the MR element—the lapping process is stopped. To measure the electrical resistance of the ELG, a lapping controller is wire bonded to at least one bonding pad that electrically connects the controller to the ELG. The positioning of the bonding pad, the use of a grounding via and the size of the grounding via can all be manipulated to increase lapping efficiency while simultaneously reducing the amount of space wasted on a row for lapping purposes.

Because many slider fabrication techniques lap a plurality of sliders simultaneously, one or more of the ELG in the regions proximate the slider may be electrically coupled to the wafer. The lapping controller is then wire bonded to the individual ELGs via bonding pads, but the controller is connected to the wafer only at a few locations. For example, the lapping controller may be wire bonded to four ELGs in a row of read heads but only have one or two electrical connections to the conductive wafer. The grounding at the wafer and subsequent current crowding can be mitigated by using both grounding vias and grounding pads. The resistances of each of the connected ELGs can be monitored by sweeping through the different wire bond connections. Minimizing the number of wire bonds by using a common ground (e.g., the conductive wafer) may provide cost savings compared to wire bonding the lapping controller to two bonding pads per read head. For example, minimizing the number of wire bonds may reduce the amount of gold wire used, reduce product defects caused by gold contamination from wire bonding, cracks near pad areas, pad defects, labor cost, and the like.

Further, the diameter of the grounding vias is important to controlling current crowding when using the wafer as a common ground. Current crowding is the effect of multiple charges accumulating in wafer, thus increasing the effective resistance of the ELG. Since the ELG resistance is used to determine stripe height error, cumulative changes in resistance can lead to dramatic error in the final lapped head. A standard grounding via used in common grounding might be around 3-4 µm. This size of grounding via is believed to have a stripe height error range of more than 3 nm when measuring 8 channels or more simultaneously. By increasing the grounding via radius when using the wafer as a common ground, the effects of current crowding can be reduced, allowing for the production of more sliders per wafer without reduction in quality.

While the foregoing is directed to embodiments of the present invention, other and further embodiments of the invention may be devised without departing from the basic scope thereof, and the scope thereof is determined by the claims that follow.

What is claimed is:

1. A device, comprising:
    a wafer comprising a plurality of peripheral grounding vias for controlling current crowding, the peripheral grounding vias having a radius of at least 10 µm;
    a plurality of sliders disposed on the wafer, each slider of the plurality of sliders comprising:
        a magnetoresistive (MR) element configured to detect magnetic orientation changes, create magnetic orientation changes or combinations thereof in a magnetic media; and
        an air bearing surface (ABS) formed proximate to the MR element;
    a kerf region positioned between the plurality of sliders;
    a plurality of electronic lapping guides (ELG) electrically coupled to one or more grounding vias and one or more grounding pads, the ELG configured to provide a resistance; and
    a bonding pad electrically coupled to the ELG, wherein the bonding pad, the ELG, and the wafer are part of a current path permitting current to flow through the ELG.

2. The device of claim 1, wherein the radius of the grounding vias are between 10 and 25 µm.

3. The device of claim 1, wherein the ELG is positioned in the kerf region.

4. The device of claim 3, wherein the ELG is electrically coupled to the bonding pad with a noble metal.

5. The device of claim 1, wherein the plurality of ELGs alternate between electrically connecting to a grounding via and electrically connecting to a grounding pad along the wafer.

6. The device of claim 1, wherein the peripheral grounding vias have a radius of between 10 and 20 µm.

7. The device of claim 1, wherein the bonding pad is positioned in the kerf region.

8. A device, comprising:
    a row comprising a plurality of kerf regions and a plurality of device regions;
    a magnetoresistive (MR) element disposed on the device regions and configured to detect magnetic orientation changes, create magnetic orientation changes or combinations thereof in a magnetic media;
    electronic lapping guides (ELGs) electrically coupled to the wafer, the ELGs comprising:
        a first internal lead connected to a bonding pad; and
        a second internal lead connected to either a grounding pad or a grounding via for providing an electrical connection to the lapping controller;
    one or more bonding pads electrically coupled to each of the ELGs; and
    one or more peripheral grounding vias positioned outside of the device region.

9. The device of claim 8, wherein the peripheral grounding vias have a radius of at least 10 um.

10. The device of claim 8, wherein the grounding vias have a radius of at least 10 um.

11. The device of claim 8, wherein at least one of the one or more bonding pads is positioned in the device region.

12. The device of claim 8, wherein the bonding pads and the ELGs are electrically coupled using a noble metal.

13. The device of claim 8, wherein at least 30% of the ELGs connect to a grounding via.

14. The device of claim 8, wherein the grounding vias have an increasing radius from center to edge of the row.

15. A system for lapping a wafer, the wafer comprising:
    a plurality of slider-kerf groups, each slider-kerf group comprising:
        a slider-kerf boundary dividing a slider portion from a kerf portion;
        a magnetoresistive (MR) element configured to sense data stored in a magnetic media, write data to the magnetic media or combinations thereof;
        an electronic lapping guide (ELG) configured to indicate, using a resistance of the ELG, a stripe height of the sensor, wherein the ELG is either electrically coupled to either the wafer through a grounding via or to the grounding pad;
        a peripheral grounding via in contact with a high conductivity material, wherein at least one grounding via is formed for every slider-kerf group; and
        a bonding pad electrically coupled to the ELG, providing a current path permitting current to flow to the ELG;
    the system comprising:
    a lapping system comprising a lapping controller and configured to simultaneously lap an air bearing surface on the plurality of sliders, wherein the wafer is configured to be mounted on the lapping system; and
    the lapping controller electrically coupled to the bonding pads, the grounding pads and the peripheral grounding vias, the lapping controller configured to measure the resistance of the ELG using the current path and provide instructions to the lapping system based on the measured resistance.

16. The system of claim 15, wherein the lapping controller measures the resistance of the ELG in a row simultaneously.

17. The system of claim 15, wherein the bonding pad is positioned in the slider portion of the slider-kerf group.

18. The system of claim 15, wherein the lapping system further comprises a piston corresponding to each slider-kerf group.

19. The system of claim 15, wherein the ELG are positioned in the kerf region of the slider-kerf group.

20. The system of claim 15, wherein the lapping controller is connected to every second ELG through the corresponding grounding pad and the peripheral grounding vias.

21. The system of claim 20, wherein the ELG which are not connected to the ELG are connected to the wafer through the corresponding grounding via.

\* \* \* \* \*